US012698135B2

(12) United States Patent
Heinzle et al.

(10) Patent No.: US 12,698,135 B2
(45) Date of Patent: Aug. 4, 2026

(54) SQUEEZE BOTTLE DISPENSER WITH SAFETY CONTROL

(71) Applicant: Aptar Radolfzell GmbH, Radolfzell (DE)

(72) Inventors: Volker Heinzle, Krauchenwies (DE); Gerald Krampen, Radolfzell (DE); Felix Schmid, Öhningen (DE); Karl Tempfli, Gottmadingen (DE)

(73) Assignee: APTAR RADOLFZELL GMBH, Radolfzell (DE)

( * ) Notice: Subject to any disclaimer, the term of this patent is extended or adjusted under 35 U.S.C. 154(b) by 79 days.

(21) Appl. No.: 18/700,967

(22) PCT Filed: Oct. 5, 2022

(86) PCT No.: PCT/EP2022/077731
§ 371 (c)(1),
(2) Date: Apr. 12, 2024

(87) PCT Pub. No.: WO2023/061829
PCT Pub. Date: Apr. 20, 2023

(65) Prior Publication Data
US 2024/0409281 A1 Dec. 12, 2024

(30) Foreign Application Priority Data
Oct. 15, 2021 (EP) .................................... 21202967

(51) Int. Cl.
*B65D 1/32* (2006.01)
*B05B 11/00* (2023.01)
(Continued)

(52) U.S. Cl.
CPC .......... *B65D 47/18* (2013.01); *B05B 11/0032* (2013.01); *B05B 11/0038* (2018.08);
(Continued)

(58) Field of Classification Search
CPC .... B65D 47/12; B65D 47/18; B65D 2215/00; B65D 2215/02; B65D 2215/04; B05B 11/0027; B05B 11/0067; B05B 11/0072
(Continued)

(56) References Cited

U.S. PATENT DOCUMENTS 7,874,461 B2 * 1/2011 Bae ..................... B05B 11/1069 222/321.9
10,781,020 B2 * 9/2020 Greiner-Perth ...... B01D 61/147
(Continued)

FOREIGN PATENT DOCUMENTS

DE 102016210992 B3 5/2017
EP 0155471 A2 9/1985
(Continued)

OTHER PUBLICATIONS

International Search Report, with English translation, issued in corresponding International Application No. PCT/EP2022/077731, date of mailing Nov. 28, 2022 (5 pages).
(Continued)

*Primary Examiner* — Luan K Bui
(74) *Attorney, Agent, or Firm* — FLYNN THIEL, P.C.

(57) ABSTRACT

A squeeze bottle dispenser having a squeezable liquid reservoir, and a discharge head with a discharge opening. The squeeze bottle dispenser has a protective sleeve captively connected to the liquid reservoir and which, with respect to a main axis, is displaceable relative to the liquid reservoir between a protection position and a release position. In the protection position, the protective sleeve prevents or impedes manual application of force to the liquid reservoir and therefore the discharge of liquid. In the release position, the protective sleeve does not prevent or impede manual application of force to the liquid reservoir and thus permits the discharge of liquid.

22 Claims, 7 Drawing Sheets

(51) Int. Cl.
*B05B 11/04* (2006.01)
*B65D 23/08* (2006.01)
*B65D 47/18* (2006.01)

(52) U.S. Cl.
CPC .............. *B05B 11/048* (2013.01); *B65D 1/32* (2013.01); *B65D 23/0885* (2013.01)

(58) Field of Classification Search
USPC ................... 222/153.14, 206, 207, 212, 213; 215/386, 390, 395
See application file for complete search history.

(56) References Cited

U.S. PATENT DOCUMENTS

| | | | | |
|---|---|---|---|---|
| 2005/0194345 | A1* | 9/2005 | Beggins | B65D 81/3881 220/737 |
| 2013/0026186 | A1* | 1/2013 | Jenkins | B05B 11/1059 222/384 |
| 2015/0166224 | A1* | 6/2015 | Greiner-Perth | B65D 83/00 222/522 |
| 2015/0166229 | A1* | 6/2015 | Wochele | B65D 41/48 222/153.05 |
| 2015/0359366 | A1* | 12/2015 | Yan | A61J 9/0623 215/395 |
| 2016/0001925 | A1* | 1/2016 | Frazier | B65D 23/0871 215/395 |
| 2016/0121349 | A1 | 5/2016 | Bertrand et al. | |
| 2017/0362000 | A1 | 12/2017 | Greiner-Perth et al. | |
| 2022/0250811 | A1 | 8/2022 | Heinzle et al. | |

FOREIGN PATENT DOCUMENTS

| | | | |
|---|---|---|---|
| EP | 4039235 | A1 | 8/2022 |
| JP | 5833443 | | 3/1983 |
| WO | 2012041614 | A1 | 4/2012 |

OTHER PUBLICATIONS

Written Opinion of International Searching Authority, issued in corresponding International Application No. PCT/EP2022/077731, date of mailing Nov. 28, 2022 (6 pages).
Japanese Office Action with English translation issued in corresponding Japanese Application No. 2024-522127 issued Apr. 20, 2026 (13 pages).

* cited by examiner

SQUEEZE BOTTLE DISPENSER WITH SAFETY CONTROL

TECHNICAL FIELD

The invention primarily relates to a squeeze bottle dispenser with a safety control device, in particular a child safety device. A squeeze bottle dispenser within the meaning of the invention is a liquid dispenser, for example for dispensing pharmaceutical liquids, which has a dimensionally stable liquid reservoir, the walls thereof being able to be at least partially depressed in a resilient manner so that pressure can be applied thereby to the liquid in the liquid reservoir.

BACKGROUND AND SUMMARY

The reduction in volume of the liquid reservoir caused by the actuation and the increase in pressure associated therewith cause liquid to be forced into a discharge head of the squeeze bottle dispenser and to the discharge opening provided therein. In squeeze bottle dispensers of the type in question and also according to the invention, an outlet valve which opens in the case of sufficient liquid pressure is generally arranged upstream of the discharge opening.

Squeeze bottle dispensers of the type in question are widely available. In particular, they are used for pharmaceutical liquids, for example eye drop liquid. A squeeze bottle dispenser of the described type is disclosed, for example, in the document DE 10 2016 210 992 B3.

In particular, in squeeze bottle dispensers which contain pharmaceutical liquids, it is important that this liquid is not inadvertently discharged by children playing or in other ways.

Squeeze bottle dispensers with child safety devices are disclosed in the post-published European patent application 21155900.0.

It is an object of the invention to provide a squeeze bottle dispenser which provides a high level of security relative to inadvertent actuation and/or actuation by children playing.

A squeeze bottle dispenser which has a liquid reservoir designed as a squeeze bottle and a discharge head with a discharge opening is proposed to this end. Preferably, the discharge head is produced as a separate assembly and coupled to the liquid reservoir, for example by a latching connection or a threaded connection. However, designs are also possible in which the discharge head and the liquid reservoir, or at least the outer surfaces thereof, are formed by an integral component.

The liquid dispenser is preferably filled with a pharmaceutical liquid, for example with a liquid containing imidazoline for the relief of conjunctival irritation. The liquid reservoir preferably has an internal volume of less than 50 ml, in particular of less than 20 ml.

The liquid reservoir is configured as a squeeze bottle. Preferably, the squeeze bottle body is configured with an inherent rigidity which allows the internal volume to be reduced by at least 5% with the application of pressure of 20 Newtons, in each case on both sides. The wall of the liquid reservoir is preferably produced from a soft plastics material, in particular from polyethylene terephthalate (PET), from polyethylene (PE) or from a cyclic olefin copolymer (COC).

Various types of liquid discharge are possible. Thus the dispenser according to one aspect of the invention can be configured for dispensing a jet of liquid or a spray. Preferably, however, the squeeze bottle dispenser is configured as a drop dispenser. To this end, the squeeze bottle dispenser preferably has drop-forming means in the region of the discharge opening, in particular in the form of a drop-forming surface which surrounds the discharge opening and where discharged liquid collects until the quantity of liquid is sufficient for the formation of a drop which is released and drops off the drop-forming means.

According to a further aspect of the invention, a squeeze bottle dispenser has a protective sleeve which is captively connected to the liquid reservoir. With respect to a main axis of the dispenser which is formed by the discharge direction of the dispenser and/or the central axis of the liquid reservoir, this protective sleeve is axially displaceable relative to the liquid reservoir repeatedly between a protection position and a release position. The displaceability can be purely translational. However, it is also possible that the protective sleeve can be displaced in a translational and a rotational manner, for example superimposed in the manner of a threaded movement or sequentially in the manner of a bayonet movement.

A captive attachment of the protective sleeve to the squeeze bottle dispenser is understood to mean within the meaning of the invention that in normal use the protective sleeve is not detached from the squeeze bottle dispenser. A detachment is possible by brute force, but this does not counteract the captive attachment within the meaning of the invention.

In the protection position, the protective sleeve is arranged relative to the liquid reservoir such that it either completely prevents a compression of the liquid reservoir or at least impedes this to a large degree by covering the access to the outer wall of the liquid reservoir. The discharge of liquid is prevented thereby.

In the release position, however, the protective sleeve permits the liquid reservoir to be compressed and thus the discharge of liquid. To this end, the protective sleeve is displaced sufficiently far relative to the liquid reservoir that it no longer represents an obstacle or at least permits a simple application of force to the liquid reservoir relative to the protection position.

The protective sleeve is displaceable at least translationally relative to the liquid reservoir for the described purpose. The extent of the displaceability in the axial direction relative to the main axis is preferably at least 20 mm, in particular preferably at least 30 mm. This amount describes the axial path over which the protective sleeve is movable between opposing end positions, i.e. between the end position assigned to the release position and that assigned to the protection position.

The protective sleeve is sufficiently rigid in order to prevent a significant reduction in the internal volume of the liquid reservoir when force is applied to the protective sleeve. Preferably, the protective sleeve is produced from a rigid plastics material, in particular from glycol-modified polycyclohexylenedimethylene terephthalate (PCTG), from polypropylene (PP), from a cyclic olefin copolymer (COC), from a cyclic olefin polymer (COP), from polyethylene terephthalate (PET) or from a hard polyethylene (HDPE). The protective sleeve does not necessarily have to be produced from a stiffer material than the liquid reservoir in order to achieve its stability. Alternatively, the greater stability can also be achieved by a greater wall thickness.

In order to permit a guided displacement of the protective sleeve, the squeeze bottle dispenser has at least one guide surface along which the protective sleeve can be displaced in a guided manner. It is possible in principle to use the outer face of the liquid reservoir directly as a guide surface.

However, a design is preferred in which a component which is separate from the liquid reservoir provides the guide surface.

One possible design provides that at least one guide surface is provided on an outer face of a guide ring. This guide ring is fastened to the liquid reservoir, to the discharge head or in an intermediate region located therebetween. An inner face of the guide ring is configured such that the ring cannot be displaced in the axial direction or can barely be displaced relative to the liquid reservoir. On the outer face, the guide ring has a sliding surface along which the protective sleeve can be slidably displaced.

A design in which the guide ring is fastened to a tapered neck region of the liquid dispenser is, in particular, advantageous. Its internal diameter in this case is smaller than the diameter of the liquid reservoir and the discharge head on both sides of the tapered neck region. The mounting of such a ring can take place by the guide ring being positioned in the neck region before the discharge head is fastened to the liquid reservoir.

In the sense of a more flexible mounting sequence, however, it is regarded as advantageous if the guide ring is designed such that it can be mounted even when the discharge head is already attached to the bottle neck. This can be achieved, for example, by a guide ring which is interrupted by a separation slot and which is temporarily expanded in the axial direction or from the side for the mounting thereof. In particular, the guide ring can be configured as an interrupted guide ring which has an interruption in one segment which spans a maximum of 120° and which preferably spans a maximum of 10°. Such an interruption of the ring structure or an at least slotted design is advantageous in order to be able to expand the guide ring during the automated mounting. Preferably, a guide ring provided with an interruption or slot and the protective sleeve which is retained thereby are adapted to one another such that the guide sleeve prevents an expansion of the guide ring which would be sufficient in order to pull the guide ring over the liquid reservoir or the discharge head and thus detach the protective sleeve from the squeeze bottle dispenser.

An alternative design of a guide ring provides that the guide ring is configured as a multipart guide ring, in particular as a two-part guide ring. The guide ring has at least two guide ring segments which are connected together for forming the joined guide ring on at least one end, preferably on both ends in each case, in particular preferably by means of a latching connection. In such a design, the guide ring is assembled from the plurality of guide ring segments only in the region of the neck region of the liquid reservoir.

In order to push the protective sleeve onto the guide ring during the course of mounting, a lead-in chamfer is preferably provided on the protective sleeve or on the guide ring. Preferably, during the mounting, the protective sleeve is pushed on from a side facing away from the discharge opening. The lead-in chamfer in this case is provided on the upper edge of the protective sleeve or on the lower end of the guide ring.

The guide ring can have on its outer face at least one guide structure extending in the direction of movement of the protective sleeve, for example in the form of a short vertical groove. This makes it possible for a protective sleeve, which is provided with an inwardly facing guide structure corresponding to said groove, not only to be guided by means of the guide ring in a longitudinally movable manner but also to be secured to the guide ring fixedly in terms of rotation at the same time. It has been shown that this is able to achieve a greater degree of stability in terms of guidance and a reduced tendency to tilting.

The guide ring preferably additionally forms a stop which limits the displacement of the protective sleeve in at least one direction of movement. The guide ring can also form a latching edge of an anti-displacement device which is explained below in more detail.

An alternative design of the guide surface provides that at least one guide surface is provided on an inner face of a guide sleeve surrounding the protective sleeve. This guide sleeve can be retained on the liquid reservoir or on the discharge head or between the liquid reservoir and the discharge head, in particular by using an interposed intermediate ring. The guide sleeve surrounds the liquid reservoir and in the axial direction is fixed thereto or is axially movable relative thereto only to a small extent. The guide sleeve has at least one recess through which the liquid reservoir can be compressed. Preferably, two opposing recesses are provided. The recesses preferably have an extent in the axial direction of at least 10 mm, preferably of at least 15 mm.

In such a design, the protective sleeve can be arranged between the guide sleeve, which is substantially axially fixed relative to the liquid reservoir, and the outer wall of the liquid reservoir. If the protective sleeve is in its protection position, it is located in the region of the at least one recess so that an application of force to the liquid reservoir is impossible. If the protective sleeve is in its release position, it releases the recess at least partially and thus permits the squeeze bottle reservoir to be compressed.

As already explained, the fastening of the guide sleeve to the squeeze bottle dispenser preferably takes place by means of an intermediate ring. As already explained above relative to the guide ring, the intermediate ring can also be configured as a slotted ring or as a ring with an interruption in order to facilitate mounting. A guide ring composed of a plurality of ring segments is also possible in the manner described.

While the described guide ring serves for the sliding guidance of the protective sleeve, the intermediate ring is preferably configured for axially fixing to the guide sleeve. Preferably, the intermediate ring and the guide sleeve are positively latched together, wherein in particular a groove is provided on one of the parts and a projection engaging therein is provided on the other part.

In the simplest case, the guidance of the protective sleeve can be carried out by the guide ring or the guide sleeve, such that the outer face of the guide ring and the inner face of the protective sleeve or the outer face of the protective sleeve and the inner face of the guide sleeve have a substantially coinciding cylindrical shape.

However, it is preferred if interlocking guide structures are provided on the guide surface and opposite thereto on the protective sleeve, the protective sleeve being guided thereby relative to the guide surface in a rotationally fixed manner or the protective sleeve being movable thereby relative to the guide surface in a rotationally and translationally guided manner, for example in the manner of a threaded movement or a bayonet movement.

In particular, it is possible to provide on one side a recessed guide groove into which a guide projection or a guide cam of the opposing face engages. Such a structure leads to more reliable guidance, in which tilting can be effectively avoided. If the guide groove has at least in some portions a helical shape, the aforementioned threaded movement is achieved. This makes it possible to displace the protective sleeve between the release position and the protection position by the application of torque and the axial displacement indirectly caused thereby.

The guide groove can have on one end, or on both axially spaced-apart ends, a partial portion which extends circumferentially to the main axis so that the partial portion does not run in the axial direction of the main axis. The protective sleeve and the liquid reservoir can be retained in the protection position or the release position by means of these end portions.

Due to the requirement of initially displacing the protective sleeve into the release position before the use of a liquid dispenser according to the invention, a large degree of safety is achieved relative to inadvertent actuation. In order to increase this degree of safety further, in particular in a design serving as a child safety device, it is possible to provide an anti-displacement device, the protective sleeve being able to be secured thereby against displacement in its protection position. In order to be transferred into the release position, the anti-displacement device initially has to be released by a separate hand movement.

In particular, the anti-displacement device can have at least one resiliently deflectable latching element which is stationary either relative to the liquid reservoir and the guide sleeve or relative to the protective sleeve, and which in the protection position cooperates with a latching edge provided on the respective other side, such that a translational or a rotational movement is prevented and thus indirectly a translational movement of the protective sleeve relative to the liquid reservoir. In order to move the liquid dispenser into the release position, the user initially has to deflect the latching element by an indirect manual application of force, so that it can be guided past the latching edge.

The resiliently deflectable latching element can be attached, in particular, to the protective sleeve or the guide sleeve, in particular as an integrally formed portion which is connected via a resiliently deformable material bridge to surrounding wall parts of the sleeve. In particular, it is preferred if the deflectable latching element is provided on the protective sleeve itself. If it is a protective sleeve which can be displaced inside a guide sleeve, the corresponding latching edge is preferably provided on the guide sleeve, in particular as an edge of a through-opening through which the latching element can be pressed. This through-opening can be identical to the recess through which the application of force to the squeeze bottle takes place in the released state. If the protective sleeve is displaced on a guide surface provided on an inner face of a guide ring, the latching edge is preferably provided on this guide ring.

In particular, in a design with a guide ring it can be expedient to configure the resiliently deflectable latching element as a rocker element with two opposing arms on both sides of a tilt axis. One of the arms can then serve for latching to the latching edge, while the other arm is manually actuated for the release. The rocker element thus brings about a change in direction for the purpose of the release.

In the protection position, the protective sleeve surrounds the liquid reservoir at least in those regions in which it might be accessible from the outside. In the release position, the protective sleeve is displaced in a translational manner relative to the liquid reservoir. Designs are conceivable in which the translational displacement of the protective sleeve takes place both in the direction of the discharge opening or away from the discharge opening.

In the first-mentioned case, the protective sleeve is closer to the discharge opening in the release position than in the protection position. This makes it possible to use an upper edge of the protective sleeve as a bearing surface which is placed in the region of the area of the skin where liquid is to be applied. In the case of eye drops, for example, the bearing surface can thus be placed in the region of the eyebrow in order to permit a particularly safe and reproducible discharge.

It is advantageous here that in the release position the bearing surface of the protective sleeve is arranged such that it is positioned relative to the main axis at a distance of a maximum of 15 mm from the discharge opening and, in particular, preferably protrudes beyond the discharge opening.

Such a design is expedient, in particular, with a guidance of the protective sleeve on an internal guide ring. Preferably, retaining means are provided, in particular in the form of stops on the guide ring and on the protective sleeve, in order to prevent a removal of the protective sleeve from the guide ring.

A further design in which the protective sleeve is displaced away from the discharge opening in the release position is preferably implemented by means of the described guide sleeve. This guide sleeve is able to retain in a secure manner the protective sleeve which has been displaced away from the discharge opening. The lengthening of the dispenser as a whole, brought about by the displacement of the protective sleeve, can provide a significant advantage when handled.

Preferably retaining means are also provided in such a design, a removal of the protective sleeve counter to the direction of the discharge opening being prevented thereby. In particular, the retaining means can be stops on the protective sleeve and the guide sleeve. A particularly advantageous design provides that the stop is formed on the side of the guide sleeve by an edge defining the actuating recess.

In the case of a design with a guide sleeve, in order to be able to displace the protective sleeve, which is arranged inside the guide sleeve, into the release position, the user has to be able to grip the protective sleeve. This can be carried out through the recess. In order to facilitate the handling relative thereto, however, it can also be provided that the protective sleeve has a distal end portion which also protrudes beyond the guide sleeve at the lower end in the protection position of the protective sleeve. In the case of a design of the protective sleeve with a closed base, the additional length of the protective sleeve can be used in order to arrange electronic dispenser components, such as for example a counter, inside the receiving space thus defined.

The protective sleeve covers the liquid reservoir at least in phases. In order to make a possible printed text on the liquid reservoir legible, however, the protective sleeve can be produced from a transparent plastics material. A printed text on the outer face of the liquid reservoir or on a label fastened to the outer face can thus be read through the protective sleeve. If a guide sleeve is provided, this can also be manufactured from this transparent plastics material.

It is also possible to use the protective sleeve, or optionally also the guide sleeve, in order to provide a printed text thereon, optionally in the form of a printed label.

It is also possible to provide a printed text, on the one hand, on the protective sleeve or the guide sleeve, and also on the liquid reservoir. This can be used, for example, in order to attach to the liquid reservoir handling instructions, or the like, which can be identified only in the release position and which are not yet required in the protection position of the protective sleeve.

Preferably, the squeeze bottle dispenser has a protective cap which in the positioned state protects the discharge opening and which is removed for using the dispenser and then repositioned again. Such a protective cap can be, in particular, a protective cap with at least one ventilation opening, wherein this ventilation opening is preferably still closed in the delivery state.

The protective cap can represent an additional security measure by cooperating with the protective sleeve such that when the protective cap is in position, or at least when the protective cap has not yet been opened for the first time, the displacement of the protective sleeve is prevented, in particular by the protective cap being arranged where the protective sleeve has to be displaced for displacement into the release position.

The above-described design in which the protective sleeve or the guide sleeve are displaceably or fixedly retained by a guide ring or an intermediate ring also represents a separate aspect of the invention. This relates to a liquid dispenser which does not necessarily have to be designed as a squeeze bottle dispenser. This liquid dispenser has a liquid reservoir in the form of a bottle body and a discharge head with a discharge opening.

The liquid dispenser also has an outer sleeve which at least temporarily surrounds the bottle body. In particular, this can be the above-described protective sleeve or the above-described guide sleeve. A ring element is provided for fastening or guiding the outer sleeve on the bottle body, the outer sleeve being fixedly or displaceably fastened to the outer face thereof.

The ring element is configured as a component which is separate from a housing of the discharge head. Preferably, the ring element can be configured as a slotted or interrupted ring element which has an interruption in one segment which spans a maximum of 120° and which preferably spans a maximum of 10°. This enables the ring element to be mounted by temporary expansion. Once the ring element is in position, the outer sleeve can be pushed on.

The aforementioned outer sleeve is preferably provided for captive attachment to the discharge head by means of the ring element. It is thus not intended that the user completely detaches the discharge head and the liquid reservoir, on the one hand, and the outer sleeve, on the other hand, from one another. Preferably, a stop of the ring element and a stop of the outer sleeve, which together define an end position beyond which the outer sleeve cannot be displaced relative to the ring element, are provided to this end.

The ring element is thus secured by the outer sleeve against expansion such that it cannot be pulled over the bottle body or over the discharge head, and thus be detached from the liquid reservoir. If the ring element is pulled over the outer sleeve toward the discharge head or toward the base of the liquid reservoir, the ring element passes into a region of the discharge head or the liquid reservoir with the greater diameter and is thus expanded until it bears against the inner face of the outer sleeve and a further displacement is thereby prevented.

A liquid dispenser according to this separate aspect of the invention can also fulfil individual features or all of the features additionally mentioned above relative to the squeeze bottle dispenser.

BRIEF DESCRIPTION OF THE DRAWINGS

Further advantages and aspects of the invention are found in the claims and the following description of preferred exemplary embodiments of the invention, which are explained hereinafter with reference to the figures.

DETAILED DESCRIPTION

Figure 1:
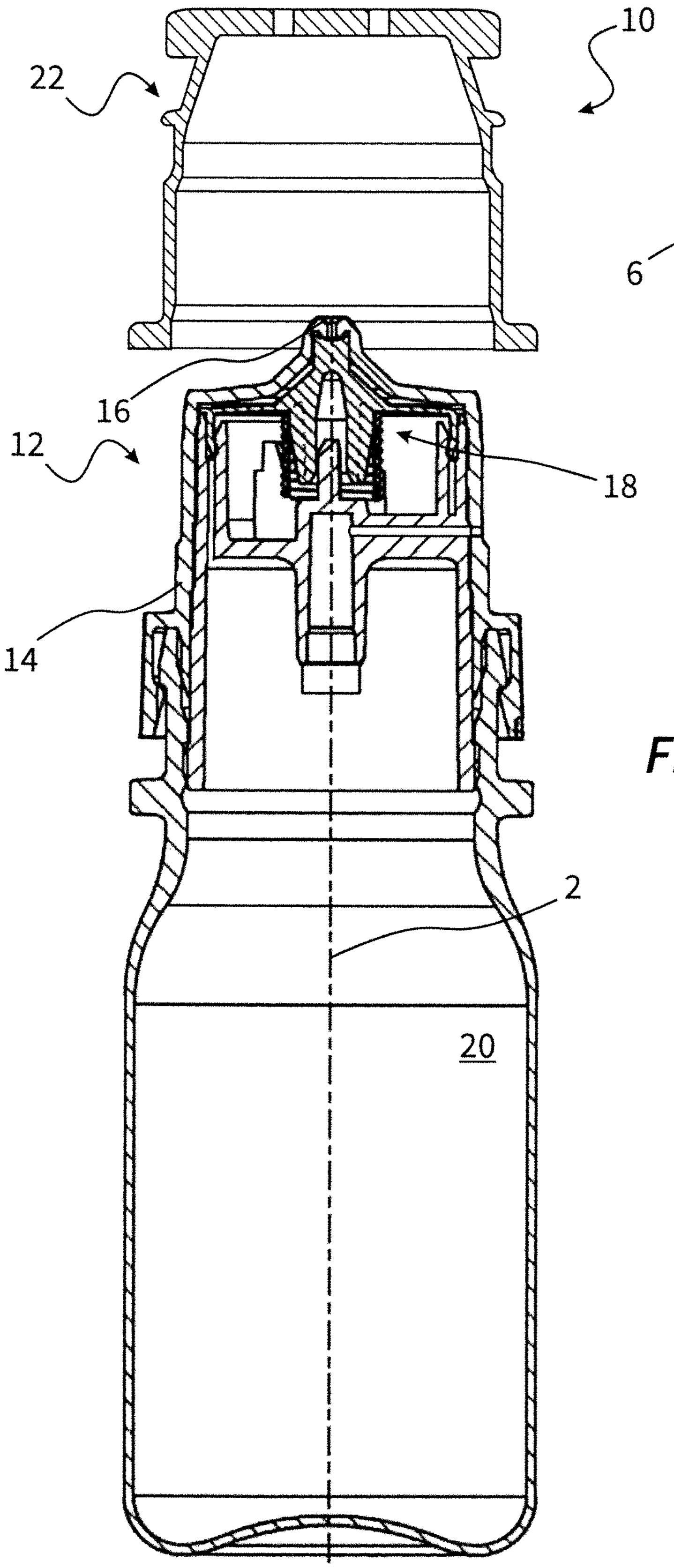
FIGS. 1 and 2 show a drop dispenser of the type in question, on the basis of which the design of a squeeze bottle dispenser of the type in question is explained.
Figure 2:
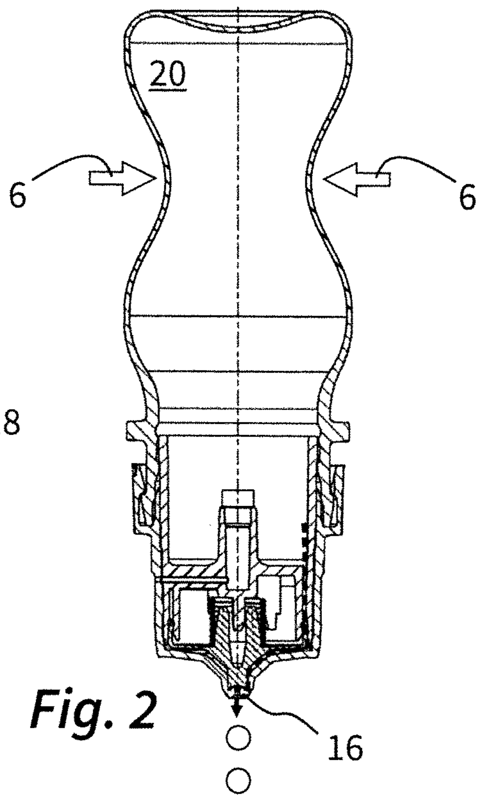

FIGS. 1 and 2 initially show a squeeze bottle dispenser 10 without safety control, which is developed further by additions to form a liquid dispenser with safety control according to the invention.

The squeeze bottle dispenser 10 has a discharge head 12 with an outer housing 14 which is perforated at the distal end by a discharge opening 16.

The squeeze bottle dispenser 10 also has a liquid reservoir 20 which is configured as a squeeze bottle, and the walls thereof can be depressed, therefore, in order to reduce the internal volume of the liquid reservoir 20 and correspondingly to increase the pressure. The discharge head is fastened to the open end of the liquid reservoir 20.

As shown in FIG. 2, when the discharge opening is oriented downwardly, due to the pressure during the course of the compression of the liquid reservoir 20 (indicated by arrows 6), the liquid contained therein is forced in the direction of the discharge head and passes to the discharge opening 16 after the opening of a discharge valve 18 caused by the pressure.

The squeeze bottle dispenser 10 can be, for example, a drop dispenser, in particular for ophthalmic use, the discharge opening thereof being configured for the discharge of drops, in particular by a drop-forming surface surrounding the discharge opening 16 on the outer face, in particular with a surrounding sharp-edged tear-off edge.

The dispenser 10 can comprise a protective cap 22 in order to protect this discharge opening 16. The protective cap is provided with ventilation openings in order to permit a rapid drying of the drop-forming surface after use.

Figure 3:
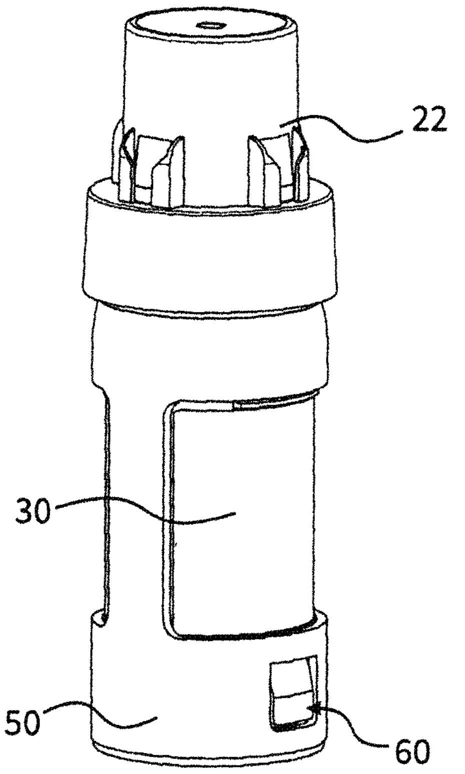
FIGS. 3 to 6B show a first exemplary embodiment of a liquid dispenser according to the invention.
Figure 4:
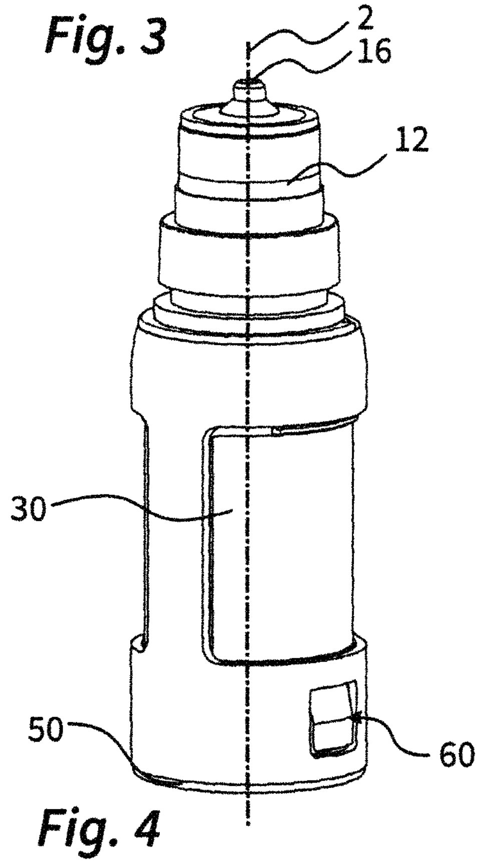
Figure 5:
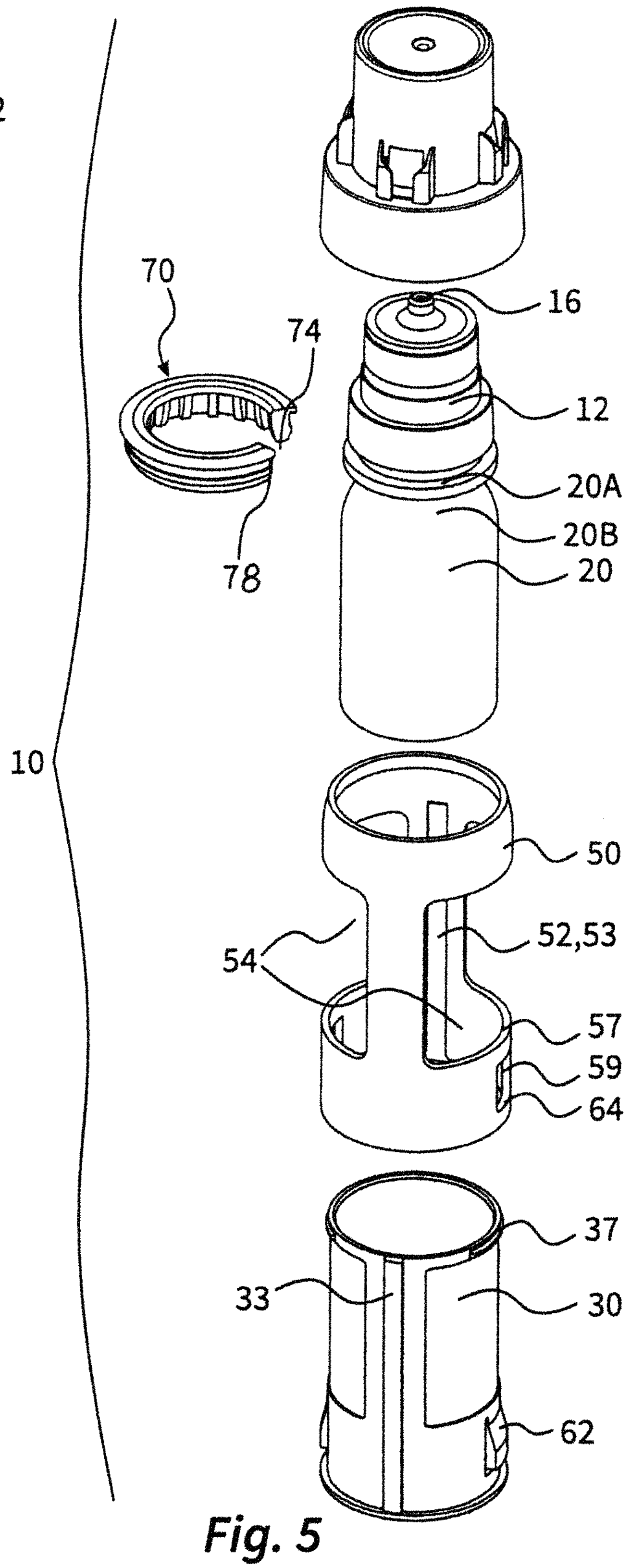

FIGS. 3 to 6B show a first exemplary embodiment of a dispenser according to the invention. This is based on the drop dispenser of FIG. 1 which is supplemented by the components 70, 50, 30 which can be clearly identified in FIG. 5. FIGS. 3 and 4 show the liquid dispenser 10 in the assembled state before and after the removal of the protective cap 22.

The additional components 30, 50, 70 represent components of a safety device which are intended to prevent an inadvertent discharge of liquid. In particular, the components together form a child safety device which is difficult for small children to overcome.

The child safety device comprises a protective sleeve 30 which is inserted into a guide sleeve 50. The guide sleeve 50 is provided in the region of its lateral surface on opposing sides with a recess 54 through which the application of force to the liquid reservoir 20 takes place as intended. However, this application of force is prevented when the protective sleeve 30 is fully inserted into the guide sleeve 50 and thus blocks the recesses 54 in the manner shown in FIGS. 3 and 4.

The guide sleeve 50 is provided on its inner face with opposing guide surfaces 52 in the form of two guide grooves 53 extending in the direction of the main axis 2. Correspondingly, guide projections 33 are provided on the outer face of the protective sleeve 30. In the inserted state in the guide sleeve 50, therefore, the protective sleeve 30 can be moved exclusively in a translational manner. On both sides on the upper edge, the protective sleeve 30 has outwardly protruding stop projections 37 which prevent the protective sleeve 30 from being fully pulled out of the guide sleeve 50. As soon as the stop 37 strikes against the lower edge of the recess openings 54 forming a further stop, it is not possible to pull out the protective sleeve 30 further.

The guide sleeve 50 has a latching through-opening 59, the lower terminal edge thereof forming a latching edge 64. A latching element 62, which can be deflected inwardly in a resilient manner and which is an integral part of the protective sleeve 30 in the manner of a tongue cut out in a U-shape, is correspondingly provided.

The combination consisting of the guide sleeve 50 and the protective sleeve 30 inserted therein is fastened by means of an intermediate ring 70 to the liquid reservoir 20 of the liquid dispenser 10. In the manner visible in FIG. 5, the intermediate ring 70 is designed not to be closed on the circumference but provided with an interruption 74. This interruption 74 makes it possible to push the intermediate ring from above or below, but in particular from one side onto a tapered region 20B of the liquid reservoir 20. Then it can be compressed to a sufficient extent that the combination consisting of the guide sleeve 50 and protective sleeve 30 can be pushed on from below.

Figure 6A:
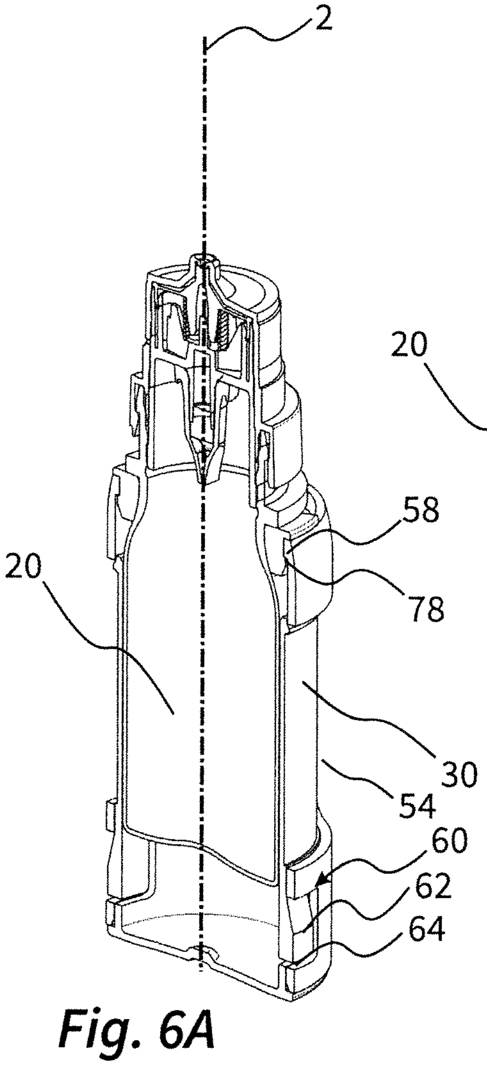

FIG. 6A shows the child safety device thus mounted in a sectional view. It can be identified that a groove 78 on the outer face of the intermediate ring 70 is used in order to fasten an inwardly facing retaining projection 58 of the guide sleeve 50.

FIG. 6A shows the protection position of the protective sleeve 30. As already explained above, in this position the protective sleeve 30 blocks the recesses 54 thereof so that it is not possible for the user to compress the liquid reservoir 20.

Figure 6B:
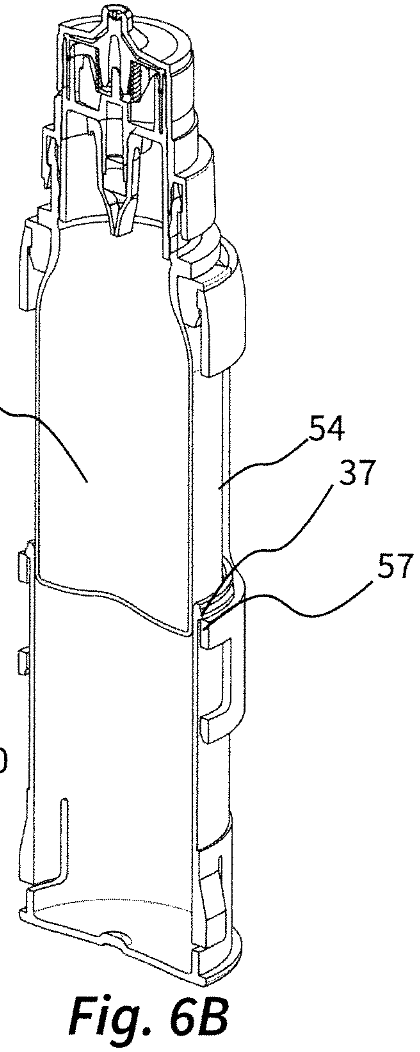

In order to prepare the dispenser for operation, the user initially has to depress the latching element 62 in a resilient manner. Once this has occurred, by the application of force on the protective sleeve 30, the user can pull down the protective sleeve relative to the guide sleeve 50 or the discharge head 12 so that the state of FIG. 6B is present. The downward displacement is limited by the stops 37, 57. In the position of FIG. 6B, the dispenser is now significantly extended as a whole, such that the dispenser can be handled more conveniently and positioned securely, for example, above an eye to be treated. If force is now applied to the liquid reservoir on both sides through the recesses 54, the pressure in the liquid reservoir is increased so that the discharge valve 18 opens and liquid is discharged through the discharge opening 16.

After use, the user slides the protective sleeve 30 back up again. A chamfer on the latching element 62 causes it to be indirectly deflected inwardly in a resilient manner until it springs back into the through-opening 59 and the protected state is produced again.

Figure 7A:
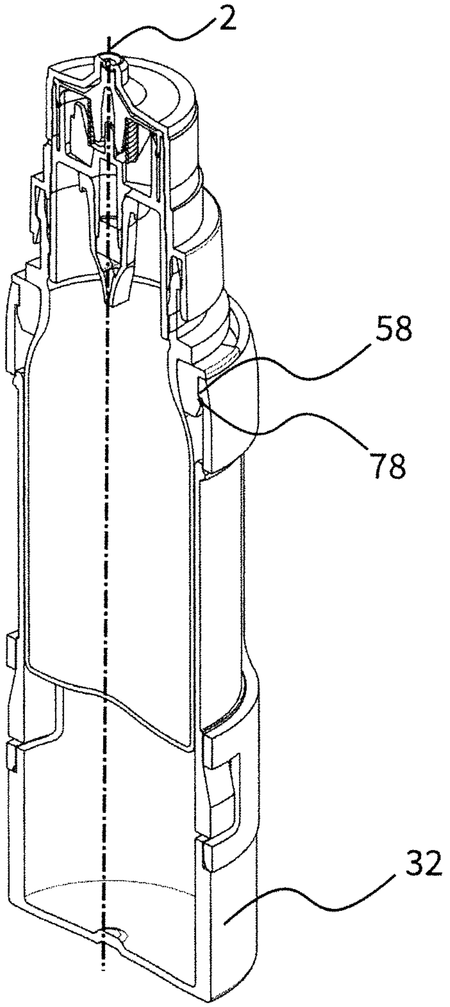
FIGS. 7A and 7B show a variant of the first exemplary embodiment.
Figure 7B:
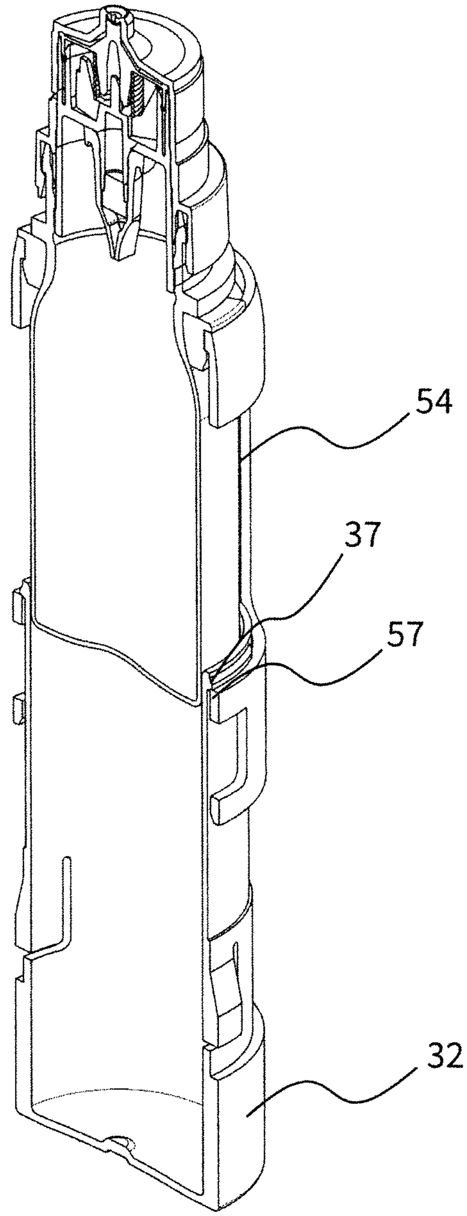

The design of FIGS. 7A and 7B differs from FIGS. 3 to 6B in that the protective sleeve is lengthened at its lower end 32, so that even in the protection position of FIG. 7A it protrudes downwardly beyond the guide sleeve 50. This can facilitate the transition to the release position of FIG. 7B.

Figure 8:
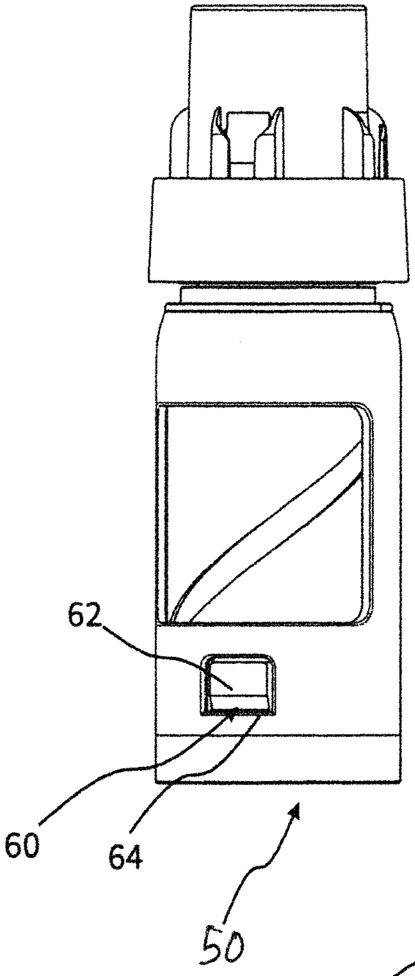
FIGS. 8 and 9 show a second exemplary embodiment of a liquid dispenser according to the invention.
Figure 9:
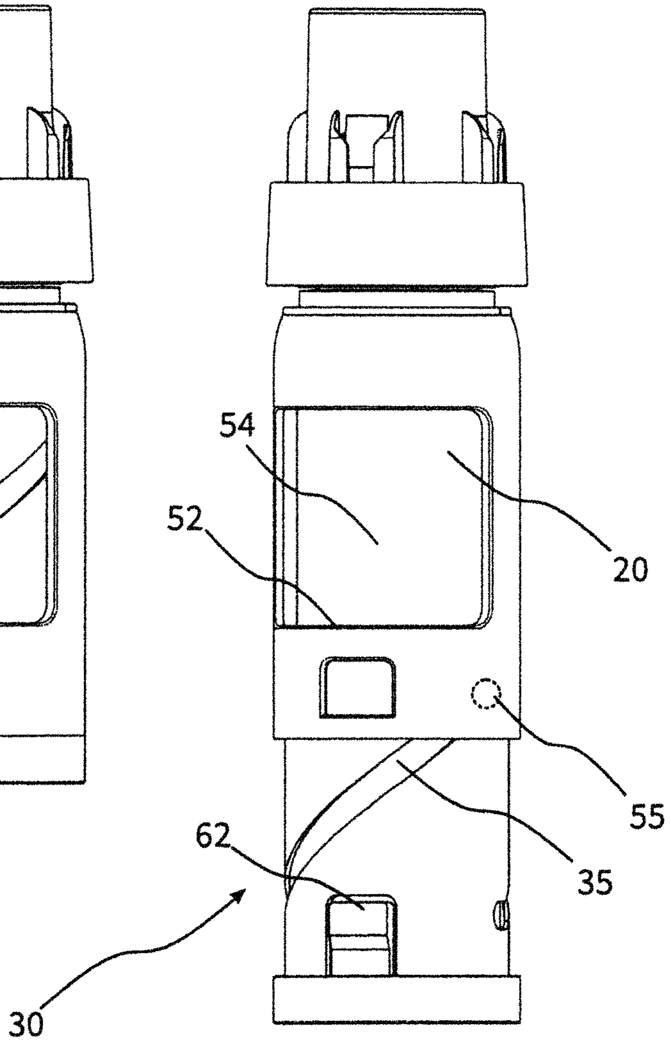
Figure 10:
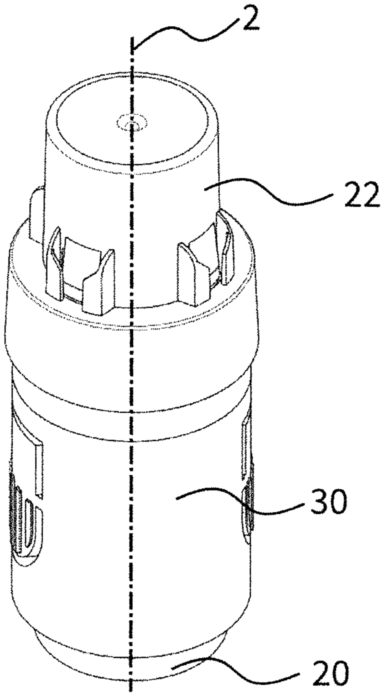
FIGS. 10 to 13B show a third exemplary embodiment of a liquid dispenser according to the invention.
Figure 11:
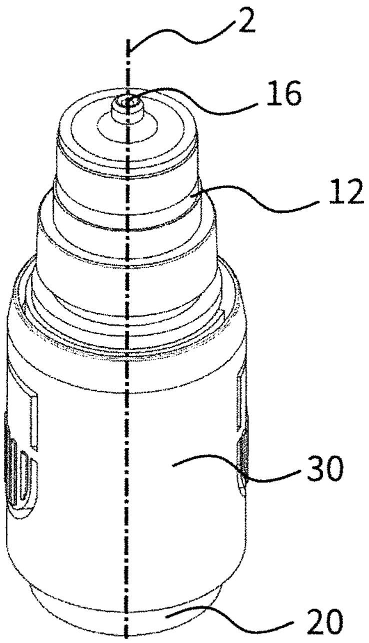

The design of FIGS. 8 and 9 is very similar to the previous FIGS. 3 to 7B. An essential difference is that here a purely translational movement of the protective sleeve 30 is not provided but rather a superimposed translational and rotational movement. A guide groove 35, which is substantially helical and which transitions only at its ends into horizontal partial portions, is provided to this end on an outer face of the protective sleeve 30. A guide cam 55 which is provided on the inner face of the guide sleeve 50 is arranged inside the groove.

It is achieved by the helical guide groove 35 that the latching element 62 initially has to be depressed in the manner already described for transferring from the protection position of FIG. 8 into the release position of FIG. 9, but then the protective sleeve 30 is not immediately pulled out but as it were unscrewed by a rotational movement and a translational movement indirectly caused thereby.

Figure 12:
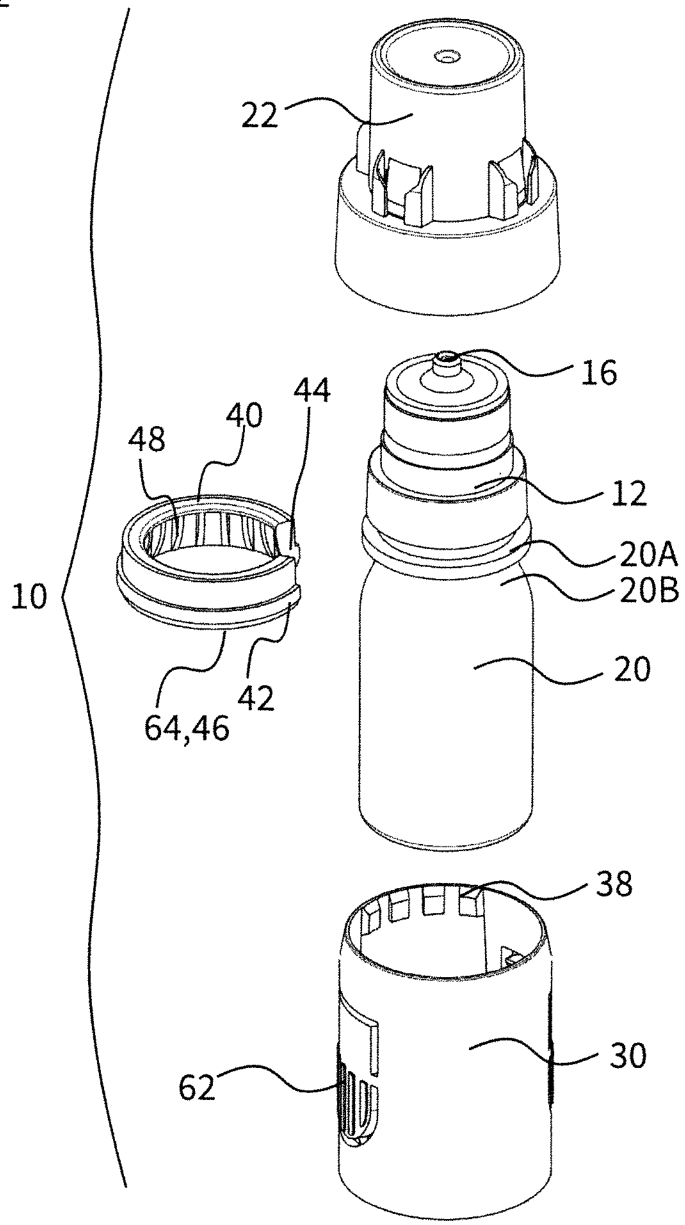

The design of FIGS. 10 to 13B has fundamental differences from the previous exemplary embodiments. As can be seen in FIG. 12, only two additional components are provided here for achieving a safety control device, namely a guide ring 40 with an interruption 44 which is pushed on from above or below, similar to the intermediate ring 70, but in particular from the side onto a tapered region 20B of the liquid reservoir 20, and a protective sleeve 30 which is pushed onto the liquid reservoir 20 surrounding the guide ring 40. Lead-in chamfers 38 are provided on the upper edge of the guide sleeve 30, said lead-in chamfers ensuring that the guide ring 40 is temporarily compressed during the mounting of the protective sleeve 30 in order to be able to expand again below the guide chamfers 38.

Figure 13A:
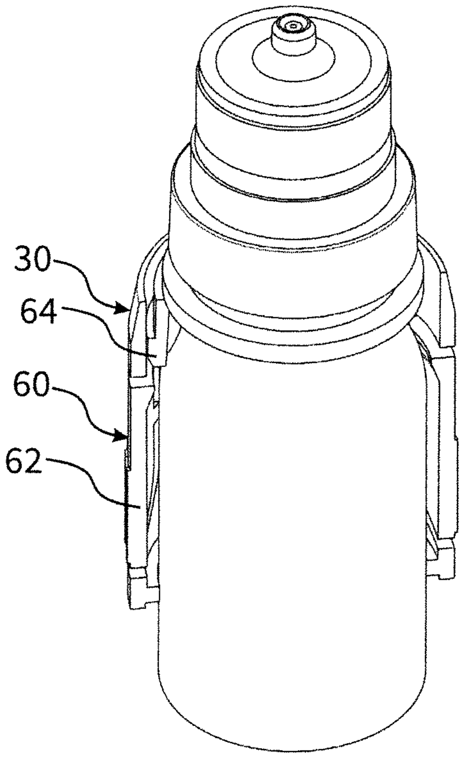
Figure 13B:
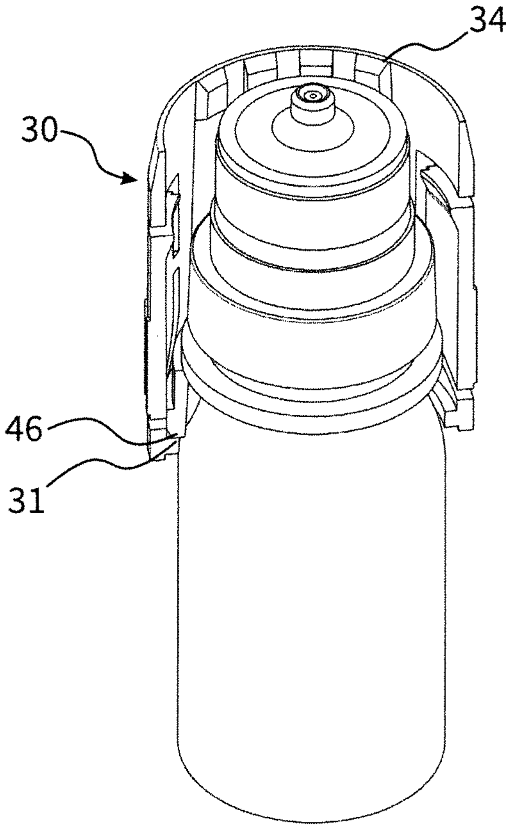

It can be seen by way of FIGS. 13A and 13B that the guide ring 40 fulfills a plurality of functions. From the protection position of FIG. 13A it is not possible to pull down the protective sleeve 30 since the chamfers previously used during mounting only act in the opposing direction. Moreover, it is initially not possible to displace the protective sleeve 30 upwardly since a latching element 62 designed as a rocker element bears with an upper edge against the latching edge 64 of the guide ring 40. Only when the lower half of the latching element 62 is pushed, is the upper half tilted away outwardly so that the protective sleeve can then be displaced upwardly. The end position is reached in the position which can be seen in FIG. 13B and in which a stop 46 of the guide ring 40 comes to bear against an inwardly facing stop 31 of the protective sleeve 30.

FIG. 13B shows the release position in which force can now be applied to the liquid reservoir 20. Contrary to FIG. 13B, this force is applied when the dispenser is in an angled position with the discharge opening 16 facing downwardly. The upper terminal edge of the protective sleeve 30 can be used in this release position by the bearing surface 34 at that point being placed against an area of the skin of the user in order to permit a drop discharge which is as accurate as possible. In particular, the bearing surface 34 can be placed against the eyebrow of the user, for example.

Figure 14:
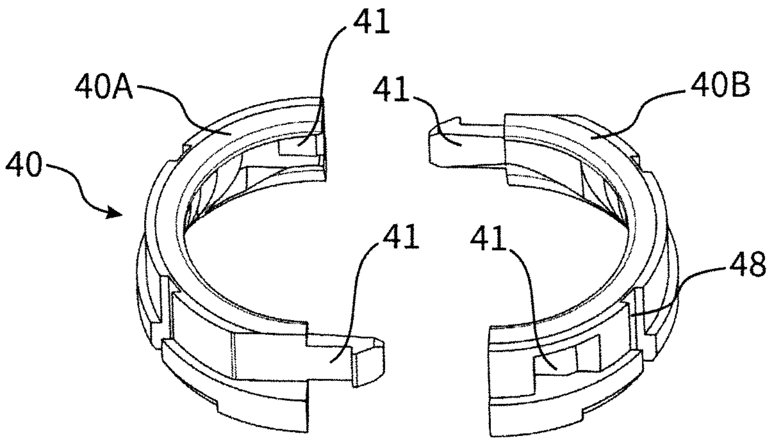
FIG. 14 shows an alternative design of a guide ring for the liquid dispenser according to the third exemplary embodiment.

FIG. 14 shows an alternative design of a guide ring 40. This guide ring is not provided with an interruption 44 which permits expansion, but rather is formed from two ring segments 40A, 40B which can be connected together via cooperating coupling means 41. This makes it possible to attach the guide ring of FIG. 14 after the liquid reservoir 20 and the discharge head 12 have been already connected together, by the two ring segments being supplied from opposing sides in the tapered region 20B and being latched so as to surround the bottle neck.

The guide ring 40 of FIG. 14 also has a guide structure 48 on the outer face. This guide structure comprises short vertical grooves. These grooves can cooperate with corresponding projections on the inner face of the protective sleeve 30 so that the protective sleeve 30 cannot be rotated relative to the guide ring about the main axis 2. This makes it possible to achieve secure guidance and a reduced tendency to tilting.

The invention claimed is:

1. A squeeze bottle dispenser comprising:

a liquid reservoir configured as a squeeze bottle;

a discharge head with a discharge opening; and a protective sleeve captively connected to the liquid reservoir, the protective sleeve, with respect to a main axis, being displaceable relative to the liquid reservoir between a protection position and a release position in a solely translational movement, a simultaneous translational and rotational movement or sequential translational and rotational movements, wherein in the protection position, the protective sleeve prevents or impedes manual application of force to the liquid reservoir and therefore discharge of liquid, and in the release position, the protective sleeve does not prevent or impede manual application of force to the liquid reservoir and thus permits the discharge of liquid.

2. The squeeze bottle dispenser as claimed in claim 1, wherein the squeeze bottle dispenser has a discharge direction defining the main axis and the liquid reservoir has a wall, the wall being at least in some portions cylindrical, the wall having a central axis defining the main axis, and the translational movement of the protective sleeve takes place along the main axis, and/or the rotational movement of the protective sleeve takes place about the main axis.

3. The squeeze bottle dispenser as claimed in claim 1, wherein the squeeze bottle dispenser has at least one guide surface, the protective sleeve being displaceable along the at least one guide surface in a guided manner.

4. The squeeze bottle dispenser as claimed in claim 3, further including a guide ring having an outer face, the at least one guide surface being disposed on the outer face of the guide ring, the guide ring being mounted on the liquid reservoir or in an intermediate region between the liquid reservoir and the discharge head or on the discharge head.

5. The squeeze bottle dispenser as claimed in claim 3, further including a guide sleeve mounted on the liquid reservoir or in an intermediate region between the liquid reservoir and the discharge head or on the discharge head, wherein the at least one guide surface is disposed on an inner face of the guide sleeve, the guide sleeve surrounding the liquid reservoir and the protective sleeve, and the guide sleeve has at least one recess, an application of force to the liquid reservoir being possible through the at least one recess when the protective sleeve is in the release position, the at least one recess being at least partially closed when the protective sleeve is in the protection position.

6. The squeeze bottle dispenser as claimed in claim 5, further comprising an intermediate ring, the guide sleeve being mounted by the intermediate ring on the liquid reservoir and/or on the discharge head.

7. The squeeze bottle dispenser as claimed in claim 5, further including interlocking guide structures disposed on the guide surface and on the protective sleeve, the protective sleeve being guided by the interlocking guide structures relative to the guide surface in a rotationally fixed manner, or the protective sleeve being guided by the interlocking guide structures relative to the guide surface in the simultaneous translational and rotational movement or in the sequential translational and rotational movements.

8. The squeeze bottle dispenser as claimed in claim 1, further comprising an anti-displacement device, the anti-displacement device securing the protective sleeve against displacement in the protection position.

9. The squeeze bottle dispenser as claimed in claim 8, further comprising a latching edge, the anti-displacement device comprising at least one resiliently deflectable latching element, the latching element in the protection position of the protective sleeve cooperating with the latching edge translationally and/or rotationally fixed to the liquid reservoir or to the protective sleeve, such that a translational and/or rotational movement of the protective sleeve is prevented.

10. The squeeze bottle dispenser as claimed in claim 1, wherein the translational movement of the protective sleeve from the protection position into the release position takes place in a direction of the discharge opening.

11. The squeeze bottle dispenser as claimed in claim 1, wherein the translational movement of the protective sleeve from the protection position into the release position takes place away from the discharge opening.

12. The squeeze bottle dispenser as claimed in claim 1, wherein:

the squeeze bottle dispenser further includes printed text on an outer face of the liquid reservoir, the protective sleeve comprises a transparent plastics material, the printed text remaining visible through the protective sleeve even when the protective sleeve is arranged in the protection position; or the squeeze bottle dispenser further includes printed text applied to the protective sleeve and no printed text is applied to an outer face of the squeeze bottle; or the squeeze bottle dispenser further includes printed text both on the protective sleeve and on an outer face of the liquid reservoir.

13. The squeeze bottle dispenser as claimed in claim 1, wherein the squeeze bottle dispenser has a removable and replaceable protective cap, the protective cap cooperating with the protective sleeve such that when the protective cap is in position, or when the protective cap has not yet been opened for the first time, displacement of the protective sleeve is prevented.

14. The squeeze bottle dispenser as claimed in claim 1, wherein:

the squeeze bottle dispenser is configured as a drop dispenser, and a drop-forming arrangement is provided in a region of the discharge opening, the drop-forming arrangement including a drop-forming surface surrounding the discharge opening; and/or the liquid reservoir comprises a flexible plastics material; and/or the protective sleeve comprises a rigid plastics material; and/or the liquid dispenser is filled with a pharmaceutical liquid; and/or the discharge head and the liquid reservoir are formed as separate components and are connected together by a latching connection; and/or the discharge head and the liquid reservoir are formed integrally as one component; and/or the discharge head comprises a discharge valve; and/or the liquid reservoir has a tapered neck region, an intermediate ring or a guide ring being provided in a region of the tapered neck region.

15. The squeeze bottle dispenser as claimed in claim 4, wherein:

the guide ring is configured as a slotted or interrupted guide ring having an interruption in one segment which spans a maximum of 120°; and/or the guide ring is configured as a multipart guide ring including two guide ring segments connected together for forming the guide ring on at least one end; and/or the guide ring is configured such that during mounting the protective sleeve can be pushed from a side facing away from the discharge opening onto the guide ring, wherein for facilitating the mounting a lead-in chamfer is provided on the guide ring and/or on the protective sleeve; and/or the guide ring has on the outer face at least one guide structure extending in a direction of movement of the protective sleeve and the protective sleeve has an inwardly facing guide structure corresponding to the at least one guide structure.

16. The squeeze bottle dispenser as claimed in claim 6, wherein:

the intermediate ring is configured as an interrupted intermediate ring having an interruption in one segment spanning a maximum of 120°; and/or the intermediate ring is configured as a multipart intermediate ring including two intermediate ring segments connected together to form the intermediate ring on at least one end via a latching connection; and/or the intermediate ring and the guide sleeve are positively latched to one another, wherein one of the intermediate ring or the guide sleeve includes an outwardly or inwardly open retaining groove, the other of the intermediate ring or the guide sleeve including a retaining projection protruding into the retaining groove.

17. The squeeze bottle dispenser as claimed in claim 7, wherein:

the guide surface is formed by a guide groove and a guide projection or a guide cam of the protective sleeve engages in the guide groove; or the guide surface has a guide projection or a guide cam engaging in a guide groove of the protective sleeve; or the guide groove has at least in some portions a helical shape so that a movement of the protective sleeve relative to the guide surface takes place during the simultaneous translational and rotational movement; or the guide groove has on at least one end a partial portion extending circumferentially to the main axis, wherein the partial portion does not extend in the axial direction to the main axis.

18. The squeeze bottle dispenser as claimed in claim 9, wherein:

the resiliently deflectable latching element is attached to the protective sleeve or a guide sleeve, the latching element is an integral part of a component substantially forming the protective sleeve or the guide sleeve; and/or the latching edge is provided on a guide sleeve; and/or the latching edge is provided on the guide ring; and/or in the protection position the latching element attached to the protective sleeve is arranged in a region of a recess, and the latching edge is formed by an edge of the recess; and/or the resiliently deflectable latching element is configured as a rocker element with two opposing arms on both sides of a tilt axis.

19. The squeeze bottle dispenser as claimed in claim 10, wherein:

the protective sleeve has an upper edge forming at least in some portions a bearing surface for placement against an area of the skin; and/or in the release position the bearing surface is arranged such that the bearing surface is positioned relative to the main axis at a distance of a maximum of 15 mm from the discharge opening; and/or the squeeze bottle dispenser includes a retaining arrangement including stops on the protective sleeve and a guide ring, and a removal of the protective sleeve is prevented by the retaining arrangement in a direction of the discharge opening.

20. The squeeze bottle dispenser as claimed in claim 11, wherein:

the squeeze bottle dispenser further includes a retaining arrangement including stops on the protective sleeve and on a guide sleeve, and a removal of the protective sleeve is prevented by the retaining arrangement counter to a direction of the discharge opening; and/or the protective sleeve has a distal end portion protruding beyond the guide sleeve at a lower end in the protection position of the protective sleeve, the distal end portion defining a receiving space, the squeeze bottle dispenser further including electronic components disposed in the receiving space.

21. A liquid dispenser comprising:

a liquid reservoir in the form of a bottle body;

a discharge head with a discharge opening;

an outer sleeve, the outer sleeve at least temporarily surrounding the bottle body; and a ring element for fastening or guiding the outer sleeve on the bottle body, the outer sleeve being fixedly or displaceably fastened to an outer face of the ring element, the ring element captively attaching the outer sleeve to the discharge head, the ring element and the outer sleeve each having a stop, and the stop of the ring element and the stop of the outer sleeve together define an end position beyond which the outer sleeve cannot be displaced relative to the ring element.

22. A liquid dispenser comprising:

a liquid reservoir in the form of a bottle body;

a discharge head with a discharge opening;

an outer sleeve, the outer sleeve at least temporarily surrounding the bottle body; and a ring element for fastening or guiding the outer sleeve on the bottle body, the outer sleeve being fixedly or displaceably fastened to an outer face of the ring element, the ring element comprising an interrupted ring element having an interruption in one segment, the interruption spanning a maximum of 120°.

* * * * *